US011082722B2

(12) United States Patent
Folgner et al.

(10) Patent No.: US 11,082,722 B2
(45) Date of Patent: Aug. 3, 2021

(54) METHOD AND SYSTEM FOR GENERATING HIGHLIGHTS FROM SCORED DATA STREAMS

(71) Applicant: Afterlive.tv Inc., San Francisco, CA (US)

(72) Inventors: Michael George Folgner, Burlingame, CA (US); Ryan Brice Cunningham, San Francisco, CA (US); Stephen Benjamin Weibel, San Francisco, CA (US); Lamthuy Tran Nguyen, San Francisco, CA (US); William Henry Darrow, San Francisco, CA (US)

(73) Assignee: AFTERLIVE.TV INC., San Francisco, CA (US)

( * ) Notice: Subject to any disclaimer, the term of this patent is extended or adjusted under 35 U.S.C. 154(b) by 0 days.

(21) Appl. No.: 16/552,291

(22) Filed: Aug. 27, 2019

(65) Prior Publication Data

US 2019/0387257 A1 Dec. 19, 2019

Related U.S. Application Data

(63) Continuation of application No. 13/359,403, filed on Jan. 26, 2012, now Pat. No. 10,440,402.
(Continued)

(51) Int. Cl.
*H04N 5/93* (2006.01)
*G11B 27/00* (2006.01)
(Continued)

(52) U.S. Cl.
CPC ....... *H04N 21/2187* (2013.01); *H04N 9/8227* (2013.01); *H04N 21/233* (2013.01);
(Continued)

(58) Field of Classification Search
CPC ......... H04N 21/2187; H04N 21/23424; H04N 21/6582; H04N 21/8456; G06K 9/00765;
(Continued)

(56) References Cited

U.S. PATENT DOCUMENTS 5,751,844 A   5/1998  Bolin et al.
6,317,722 B1  11/2001 Jacobi et al.
(Continued)

FOREIGN PATENT DOCUMENTS

JP   2005223534 A   8/2005
JP   2006157691 A   6/2006

OTHER PUBLICATIONS

European Examination Report for European Application No. 10800647. 9, dated Oct. 7, 2013, 4 pages.
(Continued)

*Primary Examiner* — Daquan Zhao
(74) *Attorney, Agent, or Firm* — Brake Hughes Bellermann LLP

(57) ABSTRACT

A method and system for generating highlights from scored data streams is disclosed. According to one embodiment, media content containing time-stamped payloads is received in a data stream from one or more sources. The received media content is recorded in a buffer for a predetermined period of time and sliced into data buckets. For each of the data buckets, a score is assigned according to user-provided keywords. The data buckets are recorded along with the assigned score to generate highlights from the one or more sources using the scores of the recorded data buckets.

19 Claims, 5 Drawing Sheets

Related U.S. Application Data

(60) Provisional application No. 61/436,292, filed on Jan. 26, 2011.

(51) Int. Cl.
    H04N 21/2187    (2011.01)
    H04N 9/82       (2006.01)
    H04N 21/233     (2011.01)
    H04N 21/25      (2011.01)
    H04N 21/475     (2011.01)
    H04N 21/845     (2011.01)
    H04N 21/8549    (2011.01)
    H04N 5/92       (2006.01)
    G06K 9/00       (2006.01)
    H04N 21/472     (2011.01)
    A63F 13/46      (2014.01)
    G06K 9/46       (2006.01)

(52) U.S. Cl.
    CPC ......... *H04N 21/252* (2013.01); *H04N 21/475* (2013.01); *H04N 21/8456* (2013.01); *H04N 21/8549* (2013.01); *A63F 13/46* (2014.09); *G06K 9/00765* (2013.01); *G06K 9/4647* (2013.01); *H04N 21/47217* (2013.01)

(58) Field of Classification Search
    CPC ..... G06K 9/4647; G06F 16/21; G06F 16/954; G06F 16/40; G06F 40/134; G11B 27/031
    USPC .......... 725/32; 707/791; 715/723, 738, 201, 715/205; 386/278, 280, 282, 248, 239, 386/326, 353
    See application file for complete search history.

(56) References Cited

U.S. PATENT DOCUMENTS

| | | | |
|---|---|---|---|
| 7,519,658 | B1 | 4/2009 | Anglin et al. |
| 7,853,622 | B1 | 12/2010 | Baluja et al. |
| 7,933,338 | B1 | 4/2011 | Choudhry et al. |
| 8,151,194 | B1 | 4/2012 | Chan et al. |
| 8,516,374 | B2 | 8/2013 | Fleischman et al. |
| 8,543,454 | B2 | 9/2013 | Fleischman et al. |
| 8,621,503 | B2 | 12/2013 | Marin et al. |
| 8,925,001 | B2 * | 12/2014 | Morris ............... H04N 7/17336 725/32 |
| 2001/0056506 | A1 | 12/2001 | Munetsugu et al. |
| 2002/0054083 | A1 * | 5/2002 | Boreczky ............. G06F 3/0481 715/738 |
| 2003/0055759 | A1 | 3/2003 | Conkwright et al. |
| 2003/0115188 | A1 | 6/2003 | Srinivasa et al. |
| 2004/0015458 | A1 * | 1/2004 | Takeuchi ............... G06F 17/18 706/14 |
| 2004/0034561 | A1 | 2/2004 | Smith et al. |
| 2004/0064316 | A1 * | 4/2004 | Gallino ................ G10L 15/063 704/251 |
| 2005/0154637 | A1 | 7/2005 | Nair et al. |
| 2005/0198570 | A1 * | 9/2005 | Otsuka ............. H04N 21/44008 715/201 |
| 2006/0042483 | A1 | 3/2006 | Work et al. |
| 2007/0130580 | A1 | 6/2007 | Covell et al. |
| 2007/0260596 | A1 | 11/2007 | Koran et al. |
| 2008/0059348 | A1 | 3/2008 | Glassman et al. |
| 2008/0071796 | A1 | 3/2008 | Ghuneim et al. |
| 2008/0133638 | A1 | 6/2008 | Fischer et al. |
| 2008/0270541 | A1 | 10/2008 | Keener et al. |
| 2009/0083396 | A1 | 3/2009 | Roos et al. |
| 2009/0132924 | A1 * | 5/2009 | Vasa .................... G11B 27/105 715/723 |
| 2009/0327437 | A1 | 12/2009 | Estrada et al. |
| 2010/0037277 | A1 | 2/2010 | Flynn-Ripley et al. |
| 2010/0046924 | A1 | 2/2010 | Ikeda et al. |
| 2010/0088373 | A1 | 4/2010 | Pinkham et al. |
| 2010/0121843 | A1 | 5/2010 | Goeldi et al. |
| 2010/0205057 | A1 | 8/2010 | Hook et al. |
| 2010/0211458 | A1 | 8/2010 | Ramer et al. |
| 2010/0251279 | A1 | 9/2010 | Piard et al. |
| 2010/0281108 | A1 | 11/2010 | Cohen et al. |
| 2010/0306805 | A1 | 12/2010 | Neumeier et al. |
| 2010/0319043 | A1 | 12/2010 | Jain et al. |
| 2011/0005606 | A1 | 1/2011 | Bartels et al. |
| 2011/0040760 | A1 | 2/2011 | Fleischman et al. |
| 2011/0041080 | A1 | 2/2011 | Fleischman et al. |
| 2011/0107369 | A1 | 5/2011 | O'Brien et al. |
| 2011/0158518 | A1 | 6/2011 | Kang et al. |
| 2011/0179385 | A1 | 7/2011 | Li et al. |
| 2011/0208722 | A1 | 8/2011 | Hannuksela et al. |
| 2011/0246528 | A1 * | 10/2011 | Hsieh .................... H04L 67/42 707/791 |
| 2011/0264682 | A1 | 10/2011 | Song et al. |
| 2011/0317979 | A1 | 12/2011 | Smith et al. |
| 2012/0167132 | A1 | 6/2012 | Mathews et al. |
| 2012/0192227 | A1 | 7/2012 | Fleischman et al. |
| 2012/0215903 | A1 | 8/2012 | Fleischman et al. |
| 2013/0014136 | A1 | 1/2013 | Bhatia et al. |
| 2013/0019262 | A1 | 1/2013 | Bhatia et al. |
| 2013/0073480 | A1 | 3/2013 | Sastri et al. |
| 2013/0086489 | A1 | 4/2013 | Fleischman et al. |
| 2013/0125159 | A1 | 5/2013 | Elizarov et al. |

OTHER PUBLICATIONS

European Extended Search Report for EP Patent Application No. 10800647.9, dated Dec. 21, 2012, 7 pages.
European Summons to Attend Oral Proceedings Pursuant to Rule 115(1) EPC for EP Patent Application No. 10800647.9, dated Mar. 20, 2015, 6 pages.
Mexican Office Action for Mexican Application No. 12/000724, dated Jun. 26, 2013, 7 pages.
Japanese First Office Action for Japanese Application No. 2012-520828, dated Feb. 18, 2014, 8 pages.
Japanese Second Office Action for Japanese Application No. 2012-520828, dated Dec. 2, 2014, 7 pages.
Ah-Pine, et al., "Crossing Textual and Visual Content in Different Application Scenarios", Multimedia Tools and Applications, vol. 42, No. 1, Kluwer Academic Publishers, Nov. 13, 2008, pp. 31-56.
Ariyasu, "An Intelligence Circulation System Based on Analyses of Viewer's Comments", IEICE Tech. Rep., vol. 108, No. 378, The Institute of Electronics, Information and Communication Engineers, Jan. 8, 2009, pp. 5-9.
Bouthemy, et al., "A Unified Approach to Shot Change Detection and Camera Motion Characterization", IEEE Trans. on Circuits and Systems for Video Technology, vol. 9, No. 7, Oct. 1999, pp. 1-21.
Coden, et al., "Multi-Search of Video Segments Indexed by Time-Aligned Annotations of Video Content", IBM Research Report, RC21444(96156), Nov. 18, 1998, pp. 1-12.
Decamp, et al., "A Human-Machine Collaborative Approach to Tracking Human Movement in Multi-Camera Video," Proceedings of the International Conference on Content-based Image and Video Retrieval (CIVR), 2009, 8 pages.
Decamp, et al., "An Immersive System for Browsing and Visualizing Surveillance Video", Proceedings of ACM Multimedia, 2010, 10 pages.
Fleischman, et al., "Grounded Language Modeling for Automatic Speech Recognition of Sports Video", Proceedings of the 46th Annual Meeting of the Association for Computational Linguistics, Jun. 15-20, 2008, pp. 121-129.
Fleischman, et al., "Mining Temporal Patterns of Movement for Video Content Classification", Proceedings of the 8th ACM International Workshop on Multimedia Information Retrieval, Oct. 2006, pp. 183-192.
Fleischman, et al., "Situated Models of Meaning for Sports Video Retrieval," Proceedings of Human Language Technology Conference of the North American Chapter of the Association of Computational Linguistics, Apr. 22-27, 2007, 4 pages.
Fleischman, et al., "Temporal Feature Induction for Sports Highlight Classification", Proceedings of the 15th International Conference on Multimedia 2007, Sep. 24-29, 2007, pp. 333-336.

(56) References Cited

OTHER PUBLICATIONS

Fleischman, et al., "Unsupervised Content-Based Indexing of Sports Video Retrieval", Proceedings of the 9th ACM Workshop on Multimedia Information Retrieval (MIR), Sep. 2007, 9 pages.

Hauptmann, et al., "Story Segmentation and Detection of Commercials in Broadcast News Video," ADL-98 Advances in Digital Libraries Conference, Apr. 22-24, 1998, 12 pages.

Jacobs, et al., "Automatic Shot Boundary Detection Combining Color, Edge, and Motion Features of Adjacent Frames", Center for Computing Technologies, 2004, 10 pages.

Kim, et al., "Extracting Opinions, Opinion Holders, and Topics Expressed in Online News Media Text", Proceedings of the Workshop on Sentiment and Subjectivity in Text, Jul. 2006, pp. 1-8.

Kubat, et al., "TotalRecall: Visualization and Semi-Automatic Annotation of Very Large Audio-Visual Corpora", Proceedings of the 9th International Conference on Multimodal Interfaces, 2007, 8 pages.

Levy, et al., "Music Information Retrieval Using Social Tags and Audio", IEEE Transactions on Multimedia, vol. 11, No. 3, Apr. 2009, pp. 383-395.

Martinez, "Mpeg-7 Overview (version 10)", International Organisation for Standardisation, Iso/Iec JTC1/SC29/ NG11, Coding of Moving Pictures and Audio, Oct. 31, 2004, 80 pp.

Dkumura, "Blog Mining", Ieice Journal, vol. 91, No. 12, the Institute of Electronics, Information and Communicatio Engineers, Dec. 1, 2008, pp_ 1054-1059_.

Pang, et al., "Opinion Mining and Sentiment Analysis", Foundations and Trends in Information Retrieval, vol. 2, No. 1-2, 2008, pp. 1-135.

International Search Report and Written Opinion for PCT Patent Application No. PCT/US2010/042362, mailed on Sep. 7, 2010, 9 pages_.

International Search Report and Written Opinion for PCT Patent Application No. PCT/US2011/025757, mailed on Apr. 19, 2011, 13 pp.

International Search Report and Written Opinion for PCT Patent Application No. PCT/US2012/046730, mailed on Sep. 21, 2012, 15 pages_.

Peacock, "Radio Audience Estimates,", Peacock Research, Inc., retrieved from <:http://www.robertoigarza.ffies. wordpress.com/2008/11/art-radio-audience-estimates-peacock-20051.pdf>, Jan. 2005, 45 pp.

Tardini, et al., "Shot Detection and Motion Analysis for Automatic Mpeg-7 Annotation of Sports Videos", 13th International Conference on Image Analysis and Processing, Nov. 2005, 8 pages_.

Nattamwar, et al., "Multimedia Explorer: Content Based Multimedia Exploration", Tencon 2008, IEEE Region 10 conference, Nov. 19, 2008, pp_ 1-6_.

* cited by examiner

METHOD AND SYSTEM FOR GENERATING HIGHLIGHTS FROM SCORED DATA STREAMS

CROSS-REFERENCE TO RELATED APPLICATIONS

This application is a continuation of, and claims priority to, U.S. patent application Ser. No. 13/359,403, filed on Jan. 26, 2012, entitled "METHOD AND SYSTEM FOR GENERATING HIGHLIGHTS FROM SCORED DATA STREAMS", which claims priority to U.S. Provisional Patent Application No. 61/436,292, filed on Jan. 26, 2011, entitled "REAL-TIME GENERATION OF AUDIO AND/OR VIDEO HIGHLIGHTS FROM SCORED DATA STREAM", the disclosures of which are incorporated by reference herein in their entirety.

FIELD

The field of the invention relates generally to content sharing over a network, and more particularly to a method and system generating highlights from scored data streams.

BACKGROUND

Television and other broadcast-consumed multimedia viewers wish to view a condensed version of the content containing top moments, or "highlights."Highlights are particularly desirable for navigating sports programming or other live event broadcasting. Network news uses highlights to discuss media previously aired, and sportscasters use highlights for game summaries. Other applications use highlights when special topics are discussed, or a longer form media is not desirable. Typically, highlights are produced by human editors who are knowledgeable in the media category and can determine the most important moments of interests from a media content. Human editors are responsible for selecting, assembling, and producing a slice of audio/video clips, and produce a list of short forms of clipped audio/video for viewing, sharing, or discussion.

Media content is manually edited and clipped using a computerized editing setup. For the case of digital media content, Digital Video Recorder (DVR)-like video/audio editing setup is used where the media is visualized in a video buffer and the editor selects and assembles highlights from the full-length media content. Manual editing and clipping requires human judgment and intervention to produce the desired highlights.

SUMMARY

A method and system for generating highlights from scored data streams is disclosed. According to one embodiment, media content containing time-stamped payloads is received in a data stream from one or more sources. The received media content is recorded in a buffer for a predetermined period of time and sliced into data buckets. For each of the data buckets, a score is assigned according to user-provided keywords. The data buckets are recorded along with the assigned score to determine highlights from the one or more sources using the scores of the recorded data buckets.

The above and other preferred features, including various novel details of implementation and combination of elements will now be more particularly described with reference to the accompanying drawings and pointed out in the claims. It will be understood that the particular methods and apparatus are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the presently preferred embodiment of the present invention and together with the general description given above, and the detailed description of the preferred embodiment given below serve to explain and teach the principles of the present invention.

Figure 1:
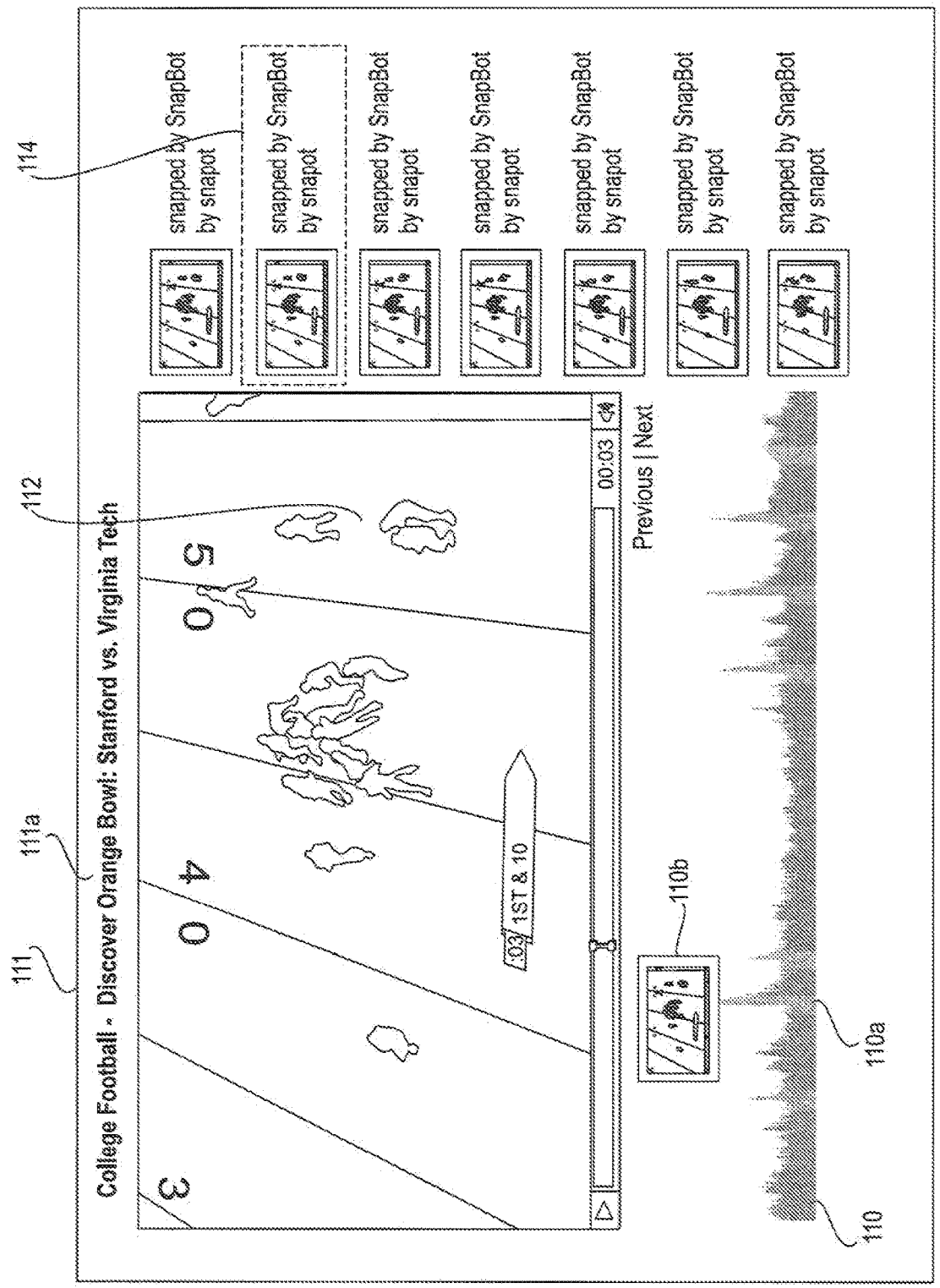
FIG. 1 illustrates a schematic view of an exemplary top moment viewer, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A method and system for generating highlights from scored data streams is disclosed. According to one embodiment, media content containing time-stamped payloads is received in a data stream from one or more sources. The received media content is recorded in a buffer for a predetermined period of time and sliced into data buckets. For each of the data buckets, a score is assigned according to user-provided keywords. The data buckets are recorded along with the assigned score to determine highlights from the one or more sources using the scores of the recorded data buckets.

Each of the features and teachings disclosed herein can be utilized separately or in conjunction with other features and teachings to provide a method and system for live media selection and sharing. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present system and method evaluates data streams from multiple input sources over time. According to one embodiment, two different data streams are received including a data stream (e.g., twitter term counts), and a content stream including media content (e.g., sports event, live broadcast). It is understood that any time-stamped streams can be used. The data stream is used to generate highlights from content stream. Content stream does not necessarily have any payload or bucket and is getting sliced to produce a highlight using the data from the data stream. According to another embodiment, a single data stream is received, and the data stream contains both payload data and content, where the content is sliced based on the corresponding payload data.

Each data point has source data, for example, counts of twitter messages containing a specific keyword or term. Each data point is operated to obtain a single-valued score. During the scoring operation, specific keywords and terms are counted and multiplied by a user-defined weight. Once the data points in a stream are recorded and scored, an algorithm (e.g., breaking a threshold of a moving average) is applied to generate highlights by selectively slicing and clipping a portion of the scored data points with reference to high scored moments that broke the threshold. Typically, data streams containing both video and audio are sliced from a starting time that is before the target highlight moment that broke the threshold. The starting time is either predetermined or determined based on the subsequent data points. Similarly, the ending time for a highlight is either predetermined (e.g., for a fixed duration) or determined based on the data points. The sliced video clips are stored in a video buffer based on a time function from that data point.

The present system and method provides highlights (or "top moments") from data streams. Human intervention is not required during or after the media airing or playing but is limited for the system setup and configuration prior to media. airing and the parameterization of system parameters after or during the media airing. The present system and method inspects data streams real-time to infer highlights based on scores without relying on manual intervention and knowledge by a human editor. Clips of highlights are produced automatically with reference to the timing of the real-time data stream.

Figure 2:
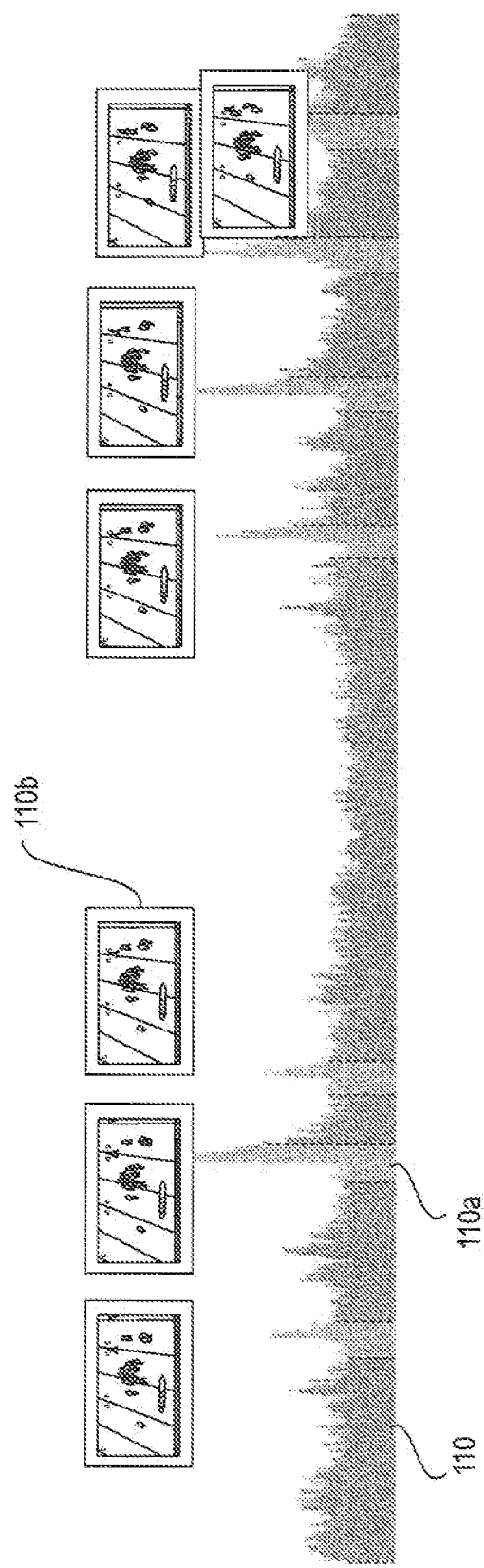
FIG. 2 illustrates a detailed schematic view of exemplary top moment visualizer, according to one embodiment.

According to one embodiment, the present system and method allows for real-time or near real-time automatic production of highlights from by real-time data streams. The present system is configured with an interval to produce a set of high-scored clips from the audio/video source. The interval is user-configured and determines the sampling rate for each bucket of data, where a bucket of data is a single value calculated by processing the data in the data stream during the interval. With reference to FIGS. 1 and 2, the interval is represented by a single data point on histogram 110*a*. For example, the interval of 10 seconds is used to plot the histogram. The values of data points are stored in a buffer for a user-configurable time period.

Clips are produced by applying an algorithm to the data points for each data bucket. For example, data points that exceed a threshold are selected, and the video segments that correspond to the selected data points are sliced for further processing. This set of clips contains highlights or top moments. Since these clips are automatically produced, they are immediately available for consumption in a short form using any techniques, such as simply playing them back in sequence or included in a commentary.

According to one embodiment, the present system and method generates highlights across many popular television stations, providing a "TV highlights from the last two hours." The present system and method may also be used to generate audio highlights across radio stations.

According to another embodiment, the present system and method is used to generate "crowd determined" highlights shown on a jumbo screen during a sports event. In one example, audio level signals from the crowd (e.g., sports events) are used as the data source. The audio level signals are summed at a 10 second interval, and the algorithm of a moving average threshold is applied to the summed audio level signals. For each data point that broke the threshold, the corresponding video signal (from a particular camera angle, or from multiple cameras) is clipped starting 5 seconds before the break for 20 seconds. These clips are played on a Jumbo Tron so that the crowd response and behavior affect the playback on the Jumbo Tron. These clips may be passed through a human to filter out when the camera did not catch the crowd cheering.

In another example, an in-stadium mobile application is provided to stadium-goers. The mobile application has a "clap" button and encourage stadium-goers to hit it when excited about something, or the mobile application uses motion sensing so stadium-goers' motion is detected when the person shakes the phone. The present system collects these data streams over time and uses them as the input data stream. The highlights could also be automatically sent to other destinations such as to a Jumbo Tron, or to a specific "live highlights" web site.

According to yet another embodiment, the present system and method displays a real-time "popularity histogram" during a live audio/video broadcast or a stream that is included in a live broadcast. The popularity histogram is generated in various ways, for example, by collecting twitter term counts real-time or crowd responses as discussed above. The popularity histogram may be sent back to viewers in a variety of ways. In one example, a popularity histogram captured from a computer output is spliced into the broadcast. In another example, a video signal that renders a histogram and/or other relevant parts (e.g., preview images of 110b) is captured with an alpha transparency color (e.g., green-screen) as background and mixed into the broadcast using a broadcast editor for display at the. bottom of the viewer's screen while the broadcast continues, or in a rectangular section in one of the upper corners. This way, the participants of the broadcast can reference it verbally and even speculate from the popularity data. For example, 'social volume' from a live program discussing controversial issues such as presidential campaign, health care reform can be shared among the participants and viewers in the form of a popularity diagram.

In another example, popularity histogram is generated from reactions by actors or participants in a live media airing. Actors or participants make reference to a previous point in a show and replay the previous point (e.g., in picture-in-picture) to analyze the audience reactions. In yet another example, the producer of a show opens a twitter event and receives replies from twitter members. The replies that took place during the point in time being referenced with a particularly insightful or inflammatory comment are included into a popularity histogram as a social "deep dive" representing the audience's reaction.

According to yet another embodiment, the present system and method is used to automatically notify news agencies of media or live media airings that are significant or newsworthy and provide those agencies with the relevant media. The present system and method determines top moments from video or audio broadcast on the Internet such as a conference or key note speech. The present system and method also provides a way of comparing the popularity of highlight moments in or across TV shows, either side-by-side in real-time for those aired simultaneously, visually compared with no simultaneous airing necessary, or via mathematical subtraction or other techniques to create a different histogram. This way, an aggregate of highlights is produced from a plurality of media airings, providing a highlight of the season or other collection.

A variety of products and devices could be created for single purposes as described in the present application. Those skilled in the art would understand that any subset of described products or interfaces can purpose into a product or device. Other useful items that could be produced by the present system and method could be a continuous stream of highlights based on most recent highest-degree moment across all available media airings within a broader system that includes many instances for many media channels and sources.

The present system possesses one or more of the following functionalities and performs in concert one or more of these functionalities based on the user settings or user-provided predetermined conditions or rules.

1. Video Capture and Encoder

A user views a media that is being broadcast or previously downloaded. Video capture/encoder 101 captures and encodes the target media containing an audio/video signal while the media is being aired or played.

2. Video Buffer

While being captured and encoded by video capture/encoder 101, the media is buffered into video buffer 102 with date/time stamp parameters. The date/time parameters may contain a time offset to account for the capture and encoding time or delay in the signal source. The encoding process inserts a delay, usually in a predictable manner (e.g., 5 seconds). Depending on the broadcast method, a different value of a delay is applied. For example, a DirecTV signal or other satellite broadcast signals introduce a few seconds of a delay in comparison to a cable network broadcasting. In some cases, satellite signals are ahead of those of cable network broadcasting. Determination and application of a proper delay corrects the timing differences between what the end consumers see including tweets or other social actions as well as the video source used for video clipping/slicing.

The present system and method is concerned with the time the consumers sees the video as the time is a critical elements to infer the consumer's reaction, and it is important to synchronize the time of broadcasting and consumer's reaction thereto. The present system and method may ingest different sources in different codecs, for example, multiple video cameras with different angles, satellite broadcasting, stored video source from a disk drive, and signals from other video servers. The sources may contain a video stream with an unknown timing. To synchronize such a video stream, a user may manually watch the ingested video stream and compare it to a broadcast stream, for example, by sitting in front of the TV and tweaking the offset value until the frames seen in the ingested stream align with the broadcast. However, since the broadcast is often ahead of the ingest stream, the user must see an image on the TV then watch a clock to measure the offset value between when image came on the TV broadcast and when it was see in the ingest stream. According to one embodiment, the present system and method provides an automatic way to calculate the offset value by taking a snapshot of the TV broadcast with a timestamp at the moment of creation and detect the frame in the ingest stream using an image matching technique. According to another embodiment, an audio signature is used to synchronize the record TV audio with a time-stamp and match the audio signature generated off the ingest stream to determine the offset value.

3. Video Slicer

A portion of the media is retrieved from video buffer 102 with an in-point and an outpoint time stamp. In one embodiment, video slicer 103 clips the broadcast media corresponding to the in-point and the out-point as configured by the user and returns an encoded media clip. In another embodiment, video slicer 103 returns an encoded media clip using the stream location and user-defined parameter(s) by seeking the media and specifying an in-point and out-point time stamp identified by the stream location and user-defined parameter(s). The user-defined in-point time stamp may be computed by an algorithm applied to the data stream, for example, the moving average example discussed above. The out-point time stamp may be determined by the next time of relative inactivity, for example, the next time the moving average stays within the threshold for 3 consecutive 10 second data points, or the time of the next move average threshold breaks in the negative direction plus a user-configurable number of seconds. In another example, the out-point may simply be determined by a defined duration added to the in-point time stamp, for example, 1 minute.

4. Data Acquirer

Payload is a user-generated text or activity from a real-time data stream such as user's comments, status, or "likes" from Twitter, Facebook, or any other social publishing content. According to one embodiment, data acquirer 104 reads payloads from a real-time data stream. Data acquirer 104 inspects data streams with a specific filter to retrieve only payloads that are relevant to the media. For example, data acquirer 104 filters the data streams with the user-specified keywords from available metadata contained in the media being aired or played. The data in the data stream contains a timestamp, a user text message, and/or a structured data bit such as a "like." The user may add these data while watching a media. These data may not be contained in a broadcast media, but may be contained in another data source(s) that are available simultaneously with the broadcast media. Data acquirer 104 ingests these data streams from one or more sources.

For example, twitter data is ingested to acquire data. In another example, a data stream that contains sports statistics or scores is used. In the latter case, the statistical data and/or scores are used to generate highlights. The payload received from twitter data is analyzed to assign scores. Depending on the time, relevancy, and other parameters, a particular keyword may be given a higher score than others. For example, the keyword 'touchdown' in a football game gets a 5, while '49ers' only gets a 1. Different scores may be given depending on who posted the data. For example, a posting from a twitter account (e.g., @ABCNews) containing specific keywords during a debate is given a score with a multiplier of 3 while postings from ordinary account holders are given a score with a unity multiplier. In other cases, specific terms such as 'breaking news" from ABCNews twitter account are given a high score to generate a highlight any time one comes in. Or a specific user (e.g., President Obama) is given a higher multiplier any time the user tweets.

According to one embodiment, data streams are configured to segment payloads using various filters and visualize the segmented payloads in various ways. For examples, a "tag cloud" of twitter terms produces a histogram for any particular term in the set, or a sum of any subset. In another example, if a user has both twitter data and Facebook 'like' data, the 'like' data is layered on the histogram in a separate color stacked on top of the twitter data.

According to one embodiment, various offsets are applied to the clipped media based on the payload, type of data stream, and/or the predetermined time delay in the stream. In the case of a payload in the form of a twitter text, the offset is calculated by the twitter text length multiplied by a static factor to account for the user typing speed. For example, a user took 40 seconds to type a twitter text using a mobile phone, "The 9ers really took it on the chin on this one. They aren't coming back next year. #49ersFail." The 18 words in 40 seconds correspond to 2.2 seconds per word. For this user, the static factor is calibrated to be 2.2 seconds/word. If the user types another message with two words, "#Touchdown 9ers!", then the offset of 4.4 seconds is applied. The first and second messages would be offset by (−)40 seconds and (−)4.4 seconds respectively to account for the user's typing time and the timestamp is placed at the point when the user tweets.

In another example, a source offset is applied to account for the delay in the twitter date and time stamping. Under a normal load, twitter message are processed, time-stamped and distributed within about S seconds. The load on the twitter server may vary as well as any other systems and/or servers that process and deliver twitter messages. The present system, and method allows posting a twitter message at a recorded time by noting its timestamp once the message is delivered via its data stream. This delay between the recorded time for posting and delivery may be used to calibrate an additional offset to twitter data.

5. Data Bucketer

Data bucketer 105 receives the real-time date/time stamped payload and groups them by date and time into sets representing a configured interval. For example, the configured interval is 10 seconds. A single score value is assigned to data points of the configured interval of 10 seconds. Data acquirer 104 pulls the stream in and applies timestamp offsets using the techniques described above. Data bucketer 105 is on its own delay to make sure that it gets data that comes later but whose timestamp is adjusted with a negative offset. Data bucketer 105 then selects all the data since the end of the last bucket, and X number of seconds further. In one embodiment, depending on the desired granularity desired the interval is configured accordingly. If the twitter volume is low, a larger interval may be used.

6. Data Scorer

A score is generated for each data bucket produced by data bucketer 150. The score for a data bucket can be determined as simply as a count of payloads in the data bucket, or a sum of scores for the payloads. In one embodiment, each keyword is given a weight to calculate a score based on various factors, for example, relevance to the media, duration, counts of payloads, etc. Data scorer 106 determines the number of keywords in each payload, sums their weighted scores, calculates the total sum of the weighted payloads, and generates an overall bucket score. Those skilled in the art would recognize other variations for scoring data. In another embodiment, the real-time data source contains keywords entered by users into a web search interface. In this case, scoring is done by the total count of keywords, or weighted counts given by each keyword. In another case, data from a particular user account is given a multiplying value.

7. Date Recorder

Figure 5A:
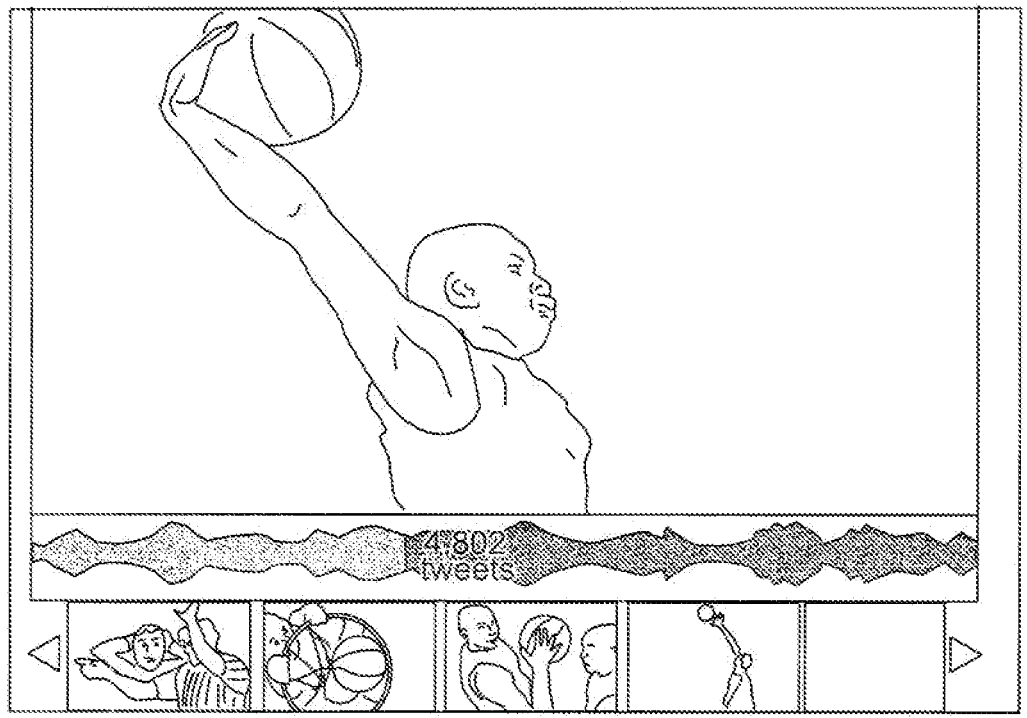
FIG. 5A illustrates an exemplary waveform projection representing highlights, according to one embodiment.
Figure 5B:
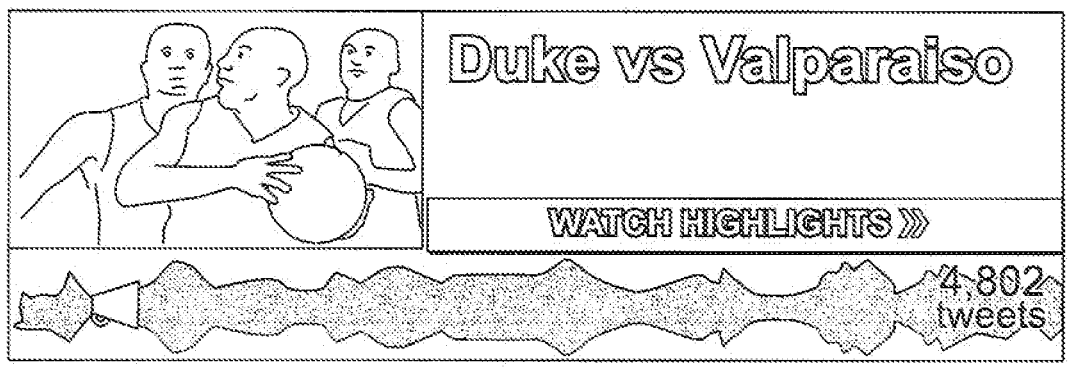
FIG. 5B illustrates another exemplary waveform projection representing highlights, according to one embodiment.

Data recorder 107 records each data bucket generated by data scorer 106 along with its score into a memory. Such recorded data is retrievable by date/time and can be visualized in a histogram or other form of chart. In one embodiment, a waveform projection representing highlights is employed. A waveform projection provides a smoothed histogram in the form of a waveform signal, i.e., mirrored around the X axis (e.g., time axis or tick marks). FIG. 5A illustrates an exemplary waveform projection representing highlights, according to one embodiment. The waveform projection is shown below the broadcast, and the thumbnail images or graphics are shown at the bottom of the user's screen. The user places a cursor on the waveform projection to display the payload data, in this example, the number of tweeter term counts. The user's placement of the cursor on the thumbnail images or graphics renders plays the corresponding highlights to be played. FIG. 5B illustrates another exemplary waveform projection representing highlights, according to one embodiment, in this case a basketball game. The title of the basketball game is shown, and the user watches the highlights by clicking the "Watch Highlights" button on the user's screen. The projection is represented by the histogram smoothed using a smoothing algorithm (e.g., weighted average, applying an average of +1 and −1 data value for example), and the image mirrored around the X axis to show a "waveform-like" image.

8. Outlier Determiner

An outlier refers to an outlying observation that deviates markedly from other members of a sample in which it appears. Outlier determiner 108 determines and records date/times as well as a degree where a bucket score exhibits a statistical outlier. Those skilled in the art would appreciate variations on determining statistical outliers in a time-sequenced data and in valuing those outliers with a computed degree. For example, a trailing moving average is used. A moving average is the sum of the last X data points divided by X. The threshold is compared to the difference in the moving average between one data point and the next. The window time and sensitivity are configured, and the degree is determined by the percent difference to the moving average.

The average score of the previous X buckets is calculated and compared with the current bucket score. The degree is determined by the percent difference between the current bucket score and the moving average. Consider an example that has the following bucket scores:

2, 3, 3, 2, 12, 3, 2, 3, 2, 9.

The threshold is configured at 200%. In this example, the fifth bucket with the score of 12 has the 4-bucket trailing moving average of 2.5 (2+3+3+2)/4, and the degree is 380% ((12−2.5)/2.5)*100, which broke the 200% threshold. A clip is created to coincide with the point in time corresponding to the 5th bucket. Similarly, the 10th bucket with the score of 9 has a 4-bucket trailing moving average of 2.5 (3+2+3+2)/4 and the degree is 260% ((9−2.5)/2.5)*100. Consequently, a clip is created to coincide with the timing of the $10^{th}$ bucket as well.

The slope is calculated as the change in the moving average. Consider an example that has the following bucket scores in the form of data (moving average, slope with, slope without, degree):

3(2.5,0,0,0), 2(2.5,0,0,0), 5(3,0.5,0,0.5), 7(4.25, 1.25,0.5, 0.75):

The X axis is considered to be tick marks (1, 2, 3, 4, 5, etc.), so the change in X (delta X) is 1 when calculating the slope of the moving average between each tick mark. Given a threshold of 0.4, the third and fourth data buckets represent points for which clips would be created.

9. Top Moment Producer

According to one embodiment, the present system is activated manually or automatically during the media airing or playing, at the end of the media airing or playing, or even across media airing or playing with normalized scoring in outlier determiner 108. Top moment producer 109 produces a configured or parameterized number of "top moments" from the date/time range given or a set based on a configured or parameterized outlier degree threshold. As an input, top moment producer 109 takes a reference to the media airing, date/time range, parameters specifying requested count of top moments or degree threshold and produces as a result a set of highlights using the video slicer 103. To determine the highlights, top moment producer 109 reads outlier buckets from outlier determiner 108 over the specified range. When creating a set number of clips, the buckets are sorted by degree and the highest set is taken. When using a threshold, all buckets over the threshold are included. Those skilled the art would understand that there are other variations of request and response parameters given date/time stamped outlier buckets. Once the bucket results set is generated, each bucket date/time is used to generate a clip by making a request to data acquirer I 04 with the bucket's date/time. In addition, outlier determiner 108 may apply statistical analysis to the data within a highlight to determine which relevant key words or data entries to display, if any.

10. Top Moment Visualizer

According to one embodiment, the present system contains an optional top moment visualizer 110. Top moment visualizer 110 produces a visualization of data obtained by data recorder 107, outlier determiner I 08, and top moment producer 109. In a preferred embodiment, the visualization takes the form of a histogram, with bucket time along the X axis and bucket score along the Y axis, and sections colored differently to indicate top moments from top moment producer 109. During the media airing, buckets are added to the user interface as the data become available.

11. Top Moment Viewer

According to one embodiment, the present system contains an optional top moment viewer 111. Top moment viewer 111 provides a user interface to play top moments produced by top moment producer 110, in combination with interactions with the visualization from top moment visualizer 110.

FIG. 1 illustrates a schematic view of an exemplary top moment viewer, according to one embodiment. Top moment viewer 111 shows title 111*a* and contains media player 112. Media player 112 show the media broadcast or content from a data stream. On the right of top moment viewer 111, list 114 of top moments of the current media being played by media player 112 is shown. Top moment visualizer 110 is shown at the bottom of top moment viewer 111. Top moments are highlighted in a different color in a histogram view 110*a*. The higher the score is, the higher the peak in the histogram view 110*a*. Top moments may also be shown in a thumbnail 110*b* when the cursor is located on top moment visualizer 110.

FIG. 2 illustrates a detailed schematic view of exemplary top moment visualizer, according to one embodiment. Histogram view 110*a* represents the score of data buckets within the specified interval. For each data bucket, a score is obtained by the user-specified keywords, parameters, and rules. When calculating the score represented by the height in histogram view 110*a*, those data that lie outside of the threshold are excluded by outlier determiner 108. Those skilled in the art would understand that data of this dimensionality can be visualized in other useful ways.

Figure 3:
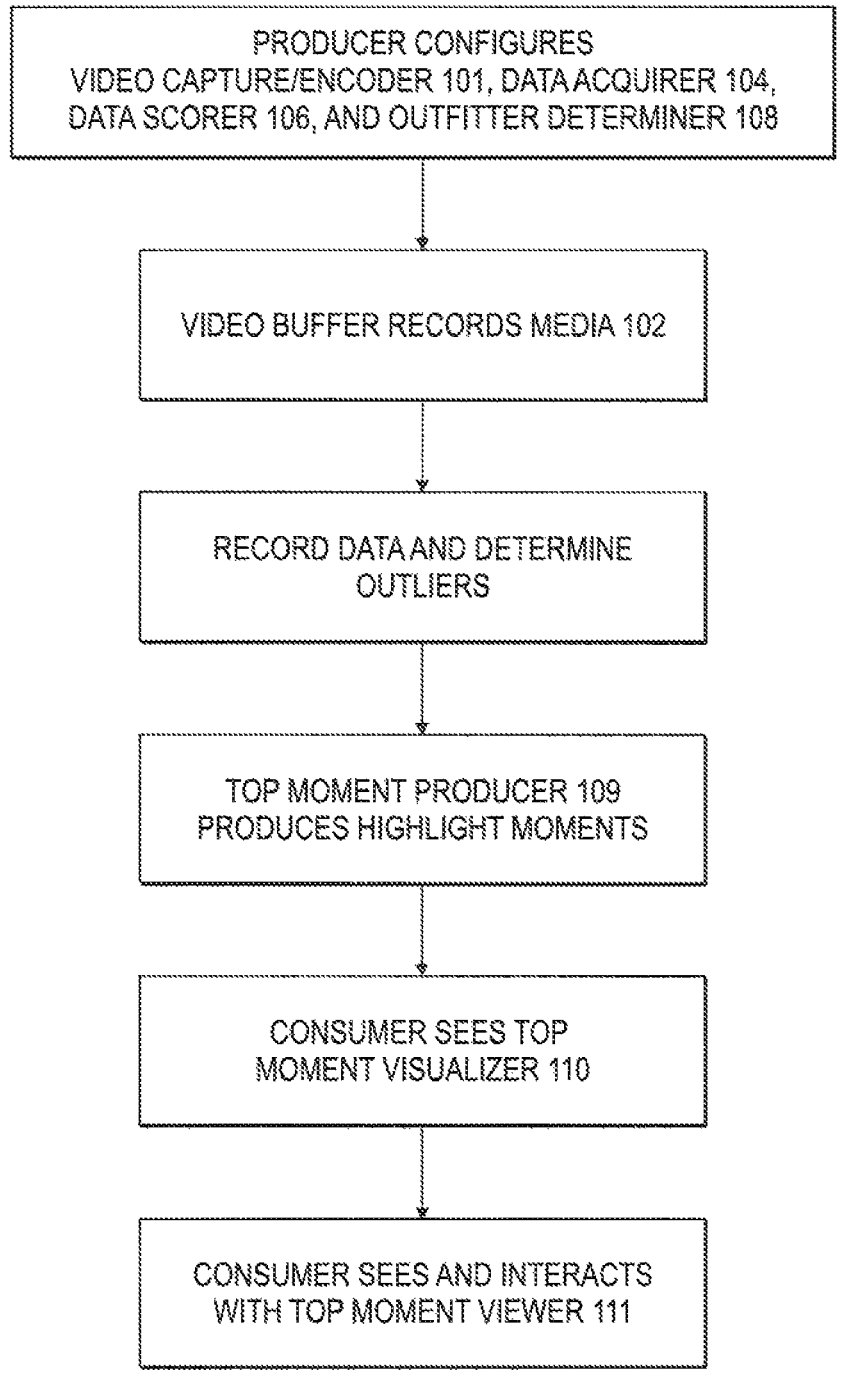
FIG. 3 illustrates an exemplary flow chart for producing highlights from a media, according to one embodiment.

FIG. 3 illustrates an exemplary flow chart for producing highlights from a media, according to one embodiment. Video capture/encoder 101, video buffer 102, and video slicer 103 work in concert to generate real-time clips from a live data stream. Data acquirer I 04, data bucketer 105, data scorer 106, and data recorder 107 work in concert to collect and score data from real-time data stream and produce outlier buckets. Top moment producer 109 uses outlier determiner 108 to gather outliers and video slicer 103 to produce the corresponding media. Top moment visualizer 110 shows data generated from data recorder 107 and outlier determiner 108. Top moment viewer 111 provides an interface into top moment visualizer 110 to play the media produced by top moment producer 109.

Producer is an individual designated by the media owner or party or may be an end user (if enabled). Producer configures the overall system before, during and/or after the media airing or playing. Producer configures the media in various ways, for example, choosing the media source for video capture/encoder IO 1, selecting a data stream and parameters for that data stream for data acquirer 104, the interval for data bucketer 105, the scoring parameters for data scorer 106, parameters for outlier determiner 108, and intervals or manual on-demand actions for top moment producer 109.

Consumers view top moment visualizer 110 and interfaces with top moment viewer 111 to watch the highlights.

Partners may request data from top moment producer 109 and outlier determiner 1 08 to create a different interface of their own design.

Referring to FIG. 3, a producer configures media capture/encoder 101, data acquirer 104, data scorer 106, and outlier determiner 108 (301). The media is recorded in video buffer 102 (302). Outlier determiner I 08 determines outliers from the recorded data (303). Top moment producer 109 produces highlight moments (304). Consumer sees the media via top moment visualizer 110 (305) and interacts with top moment viewer 111 (306).

Figure 4:
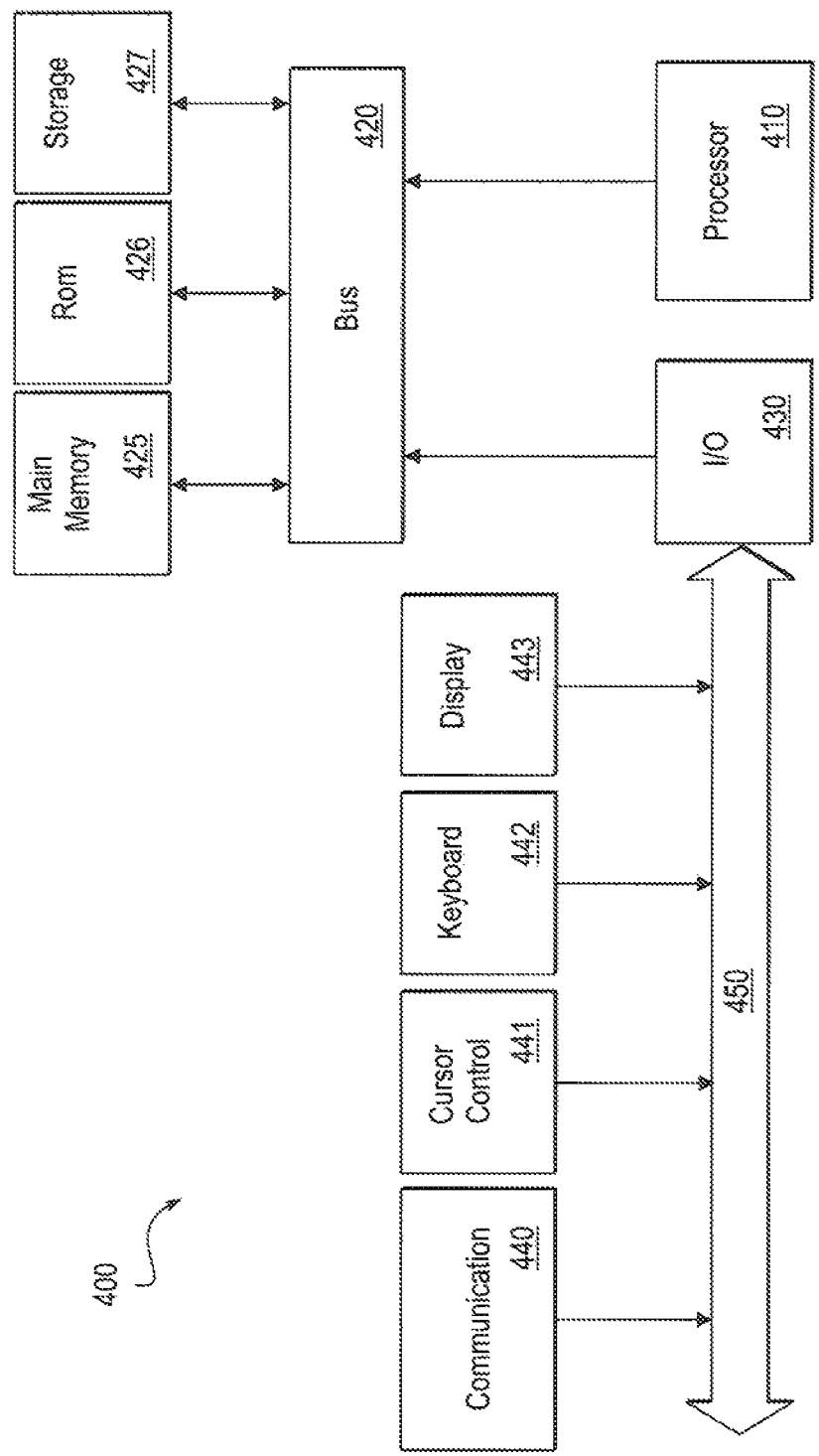
FIG. 4 illustrates an exemplary computer architecture for use with the present system, according to one embodiment.

FIG. 4 illustrates an exemplary computer architecture 400 for use with the present system, according to one embodiment. Computer architecture 400 may be used to implement an online referral system with all or a part of the components shown in FIGS. 1 and 2. One embodiment of architecture 400 comprises a system bus 420 for communicating information, and a processor 410 coupled to bus 420 for processing information. Architecture 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Architecture 400 also may include a read only memory (ROM) and/or other static storage device 426 coupled to bus 420 for storing static information and instructions used by processor 410.

A data storage device 427 such as a flash memory, a magnetic disk or optical disc and its corresponding drive may also be coupled to computer system 400 for storing information and instructions. Architecture 400 can also be coupled to a second I/O bus 450 via an I/O interface 430. A plurality of I/O devices may be coupled to I/O bus 450, including a display device 443, an input device (e.g., an alphanumeric input device 442 and/or a cursor control device 441).

The communication device 440 allows for access to other computers (servers or clients) via a network. 'The communication device 440 may comprise a modem, a network interface card, a wireless network interface or other well-known interface device, such as those used for coupling to Ethernet, token ring, or other types of networks.

Although the preferred embodiments of the present invention have been illustrated and described in detail, it will be readily apparent to those skilled in the art that various modifications may be made therein without departing from the spirit of the present invention or from the scope of the appended claims.

What is claimed is:

1. A method, comprising:
   receiving media content in a media content stream from a media content source;
   receiving a data stream including time-stamped payloads, the time-stamped payloads corresponding to time-stamped crowd responses to the media content; and
   generating a top moment viewer for display with the media content stream based on the time-stamped payloads included in the data stream, including:
   analyzing data points in the data stream of time-stamped payloads corresponding to the time-stamped crowd responses to the media content; and
   generating a visual representation of scores of the time-stamped crowd responses, the visual representation corresponding in time with the media content based on the analysis, including generating a histogram of the scores corresponding in time with the media content based on the time-stamped payloads based on the analysis; and
   displaying an interface, including:
   displaying a media player displaying the media content stream; and
   displaying the top moment viewer together with the media player displaying the media content stream, the top moment viewer including the histogram displaying the visual representation of the scores of time-stamped crowd responses corresponding to the displayed media content stream.

2. The method of claim 1, wherein the time-stamped payloads include one or more of user-provided text, activity, comments, status, keywords and likes collected in response to user viewing of the media content.

3. The method of claim 1, wherein analyzing data points in the data stream includes:
   assigning a score for each of a plurality of data buckets within specified intervals based a detected number of instances of one or more specified keywords in the time-stamped crowd responses to the media content.

4. The method of claim 3, wherein assigning the score includes:
   assigning a numerical score for each detected instance of the one or more user-specified keywords; and
   multiplying the detected number of instances of the specified keyword from the time-stamped payloads for each data point in a moving window by a numerical weight for each data bucket.

5. The method of claim 3, wherein generating the visual representation and displaying the top moment viewer includes:
   displaying the scored plurality of data buckets along a set of X-Y axes to define the histogram, with bucket time along the X-axis, and bucket score long the Y-axis.

6. The method of claim 3, wherein the visual representation is a graphical representation, and assigning a score for each of the plurality of data buckets includes:
   analyzing and scoring the data points in the graphical representation using a moving window average;
   segmenting the media content stream into a plurality of segments based on the analysis of the graphical representation of scores with respect to a threshold score;
   identifying segments, of the plurality of segments, having a score that is greater than the threshold score; and
   identifying the segments, of the plurality of segments, having the score greater than the threshold score as top moments of the media content stream.

7. The method of claim 6, analyzing and scoring the data points in the graphical representation using the moving window average including:
   assigning a numerical score of 1 for each detected instance of the one or more specified keywords;
   assigning each detected instance of the one or more specified keywords to a respective bucket of the plurality of buckets, based on the time-stamped payload corresponding to the detected instance of the one or more specified keywords; and summing the numerical score for each detected instance of the one or more specified keywords included in each of the plurality of buckets.

8. The method of claim 6, wherein displaying the top moment viewer also includes displaying a list of top moments, including:
displaying a thumbnail corresponding to each segment, of the plurality of segments, identified as a top moment of the media content stream, each thumbnail being selectable for playback of the corresponding segment.

9. The method of claim 6, wherein displaying the top moment viewer includes:
displaying the top moment viewer as a waveform projection of the scored data points; and
displaying portions of the waveform projection corresponding to the segments, of the plurality of segments, identified as top moments, in a different color from remaining portions of the waveform projection.

10. The method of claim 1, wherein the media content stream is a live media content stream, and wherein receiving the data stream including the time-stamped payloads includes receiving the data stream in real-time, as the time-stamped crowd responses to the media content are received.

11. The method of claim 10, further comprising updating the top moment viewer and displaying an updated interface as new time-stamped crowd responses to the media content are received.

12. The method of claim 1, further comprising:
recording the received media content stream as the received media content stream is displayed on a first display device; and
displaying the interface including the media player and the top moment viewer to a second display device for display on the second display device, wherein the first display device is operable to display the media content stream without requiring input from the second display device, and wherein the first display device and the second display device are not simultaneously displaying respectively the media content stream and the interface at the same time that the data stream including time-stamped payloads is received.

13. A non-transitory computer readable medium, having stored thereon computer-readable instructions, which, when executed by a processor, cause the processor to perform a method, comprising:
receiving media content in a media content stream from a media content source;
receiving a data stream including time-stamped payloads, the time-stamped payloads corresponding to time-stamped crowd responses to the media content; and
generating a top moment viewer for display with the media content stream based on the time-stamped payloads included in the data stream, including:
analyzing data points in the data stream of time-stamped payloads corresponding to the time-stamped crowd responses to the media content; and
defining a visual representation of scores of the time-stamped crowd responses, the visual representation corresponding in time with the media content based on the analysis, including generating a histogram of the scores corresponding in time with the media content based on the time-stamped payloads based on the analysis; and
displaying an interface, including:
displaying a media player displaying the media content stream; and
displaying together with the media player displaying the media content stream, the top moment viewer, the top moment viewer including the histogram displaying the visual representation of the scores of time-stamped crowd responses corresponding to the displayed media content stream.

14. The method of claim 13, wherein analyzing data points in the data stream includes:
assigning a numerical score for each of a plurality of data buckets within specified intervals based a detected number of instances of one or more specified keywords in the time-stamped crowd responses to the media content.

15. The method of claim 14, wherein defining the visual representation and displaying the top moment viewer includes:
displaying the scored plurality of data buckets along a set of X-Y axes to define the histogram, with bucket time along the X-axis, and bucket score long the Y-axis.

16. The method of claim 14, wherein the visual representation is a graphical representation, and wherein assigning a score for each of the plurality of data buckets includes:
analyzing and scoring the data points in the graphical representation using a moving window average;
segmenting the media content stream into a plurality of segments based on the analysis of the graphical representation of scores with respect to a threshold score;
identifying segments, of the plurality of segments, having a score that is greater than the threshold score; and
identifying the segments, of the plurality of segments, having the score greater than the threshold score as top moments of the media content stream.

17. The method of claim 16, wherein displaying the top moment viewer also includes displaying a list of top moments, including:
displaying a thumbnail corresponding to each segment, of the plurality of segments, identified as a top moment of the media content stream, each thumbnail being selectable for playback of the corresponding segment.

18. The method of claim 16, wherein displaying the top moment viewer includes:
displaying the top moment viewer as a waveform projection of the scored data; and
displaying portions of the waveform projection corresponding to the segments, of the plurality of segments, identified as top moments, in a different color from remaining portions of the waveform projection.

19. The method of claim 13, wherein the media content stream is a live media content stream, and wherein receiving the data stream including the time-stamped payloads includes:
receiving the data stream in real-time, as the time-stamped crowd responses to the media content are received; and
updating the top moment viewer and displaying an updated interface as new time-stamped crowd responses to the media content are received.

* * * * *